United States Patent [19]
Benvenuto

[11] Patent Number: 5,899,500
[45] Date of Patent: May 4, 1999

[54] STAGED COINJECTION MOLDING PROCESS FOR PRODUCING VARIABLY FLEXIBLE ARTICLES

[75] Inventor: Guido Benvenuto, Windsor, Canada

[73] Assignee: Ventra Group, Inc., Windsor, Canada

[21] Appl. No.: 08/629,690

[22] Filed: Apr. 9, 1996

[51] Int. Cl.[6] ............................. B62D 25/16; B29C 45/16
[52] U.S. Cl. ........................................ 280/851; 264/328.8
[58] Field of Search ..................................... 280/848, 849, 280/152.3, 851, 853, 854; 264/255, 328.8

[56] References Cited

U.S. PATENT DOCUMENTS

| | | | |
|---|---|---|---|
| D. 241,829 | 10/1976 | Hall | D12/16 |
| 3,953,053 | 4/1976 | Arenhold | 257/76 |
| 4,715,802 | 12/1987 | Arai | 264/328.8 |
| 4,990,301 | 2/1991 | Krishnakumar et al. | 264/255 |
| 5,032,341 | 7/1991 | Krishnakumar et al. | 264/255 |
| 5,049,345 | 9/1991 | Collette et al. | 264/255 |
| 5,120,082 | 6/1992 | Ito | 280/851 |
| 5,375,882 | 12/1994 | Koch, III | 280/851 |

FOREIGN PATENT DOCUMENTS

| | | | |
|---|---|---|---|
| 449666 | 10/1991 | European Pat. Off. | 264/328.8 |
| 2918830 | 11/1980 | Germany | 280/851 |
| 1181666 | 2/1970 | United Kingdom | 280/851 |

*Primary Examiner*—Brian L. Johnson
*Assistant Examiner*—Frank Vanaman
*Attorney, Agent, or Firm*—Dykema Gossett PLLC

[57] ABSTRACT

A staged coinjection molding process to produce a vehicular mud guard or similar molded article having regions of different mechanical properties. The process includes the steps of injecting a relatively small quantity of low flexural modulus (flexible) plastic resin to form a skin along the proximal walls of the mold cavity, followed by an injection of high flexural modulus (stiff) plastic resin. Finally, a second injection of flexible resin is introduced into the mold to force to stiff material to the distal region of the mold. This results in the two dissimilar plastic materials having a longitudinal interface to reduce the risk of delamination.

16 Claims, 2 Drawing Sheets

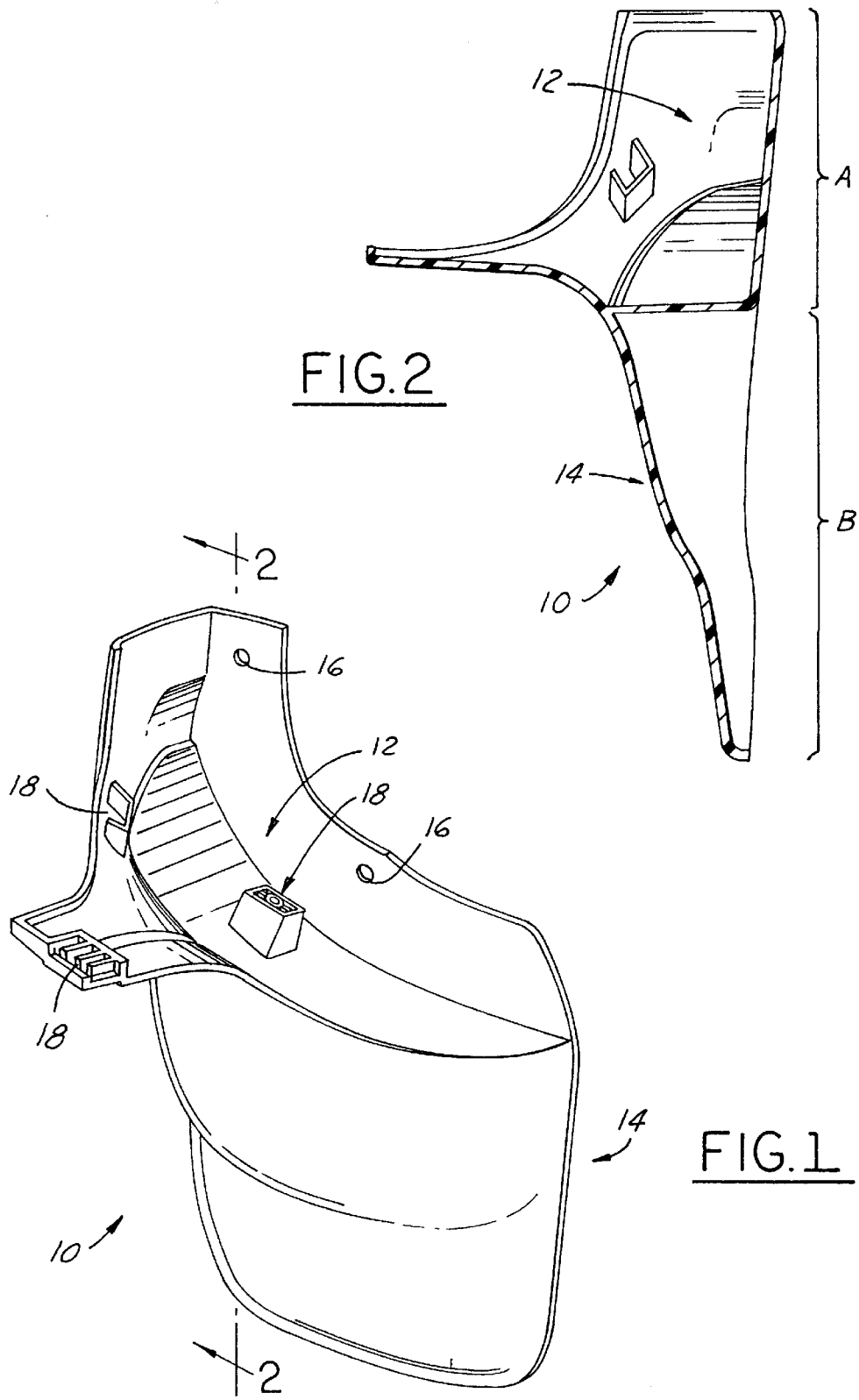

STAGED COINJECTION MOLDING PROCESS FOR PRODUCING VARIABLY FLEXIBLE ARTICLES

BACKGROUND OF THE INVENTION

The present invention relates to a mud guard for a vehicular wheel and to the improved injection molding process for producing the mud guard or any similar article of manufacture. More particularly, the invention relates to a mud guard fastened to the body of a vehicle directly behind a road wheel. In such an application, it is desirable to have the mud guard formed of a material which is flexible, especially under cold weather conditions, to deflect under the impact imparted by curbs and parking blocks without breaking. A mud guard in which uniformly soft and flexible, however, presents a certain problem of fit and finish at its upper body attachment point. Typically this soft material tends to "walk" away from the body surface leaving gaps between the mud guard and the vehicle body. It is desirable, therefore, to have the upper portion of the mud guard relatively stiff at the point of attachment to the vehicular body to allow for uniform attractive attachment to the vehicle.

Current practice in the industry achieves the desired stiff upper configuration of a mud guard by the molding of the mud guard around a stiff metal insert in the upper region of the mud guard so that the upper region is rigid and the lower region of the guard is flexible.

Alternatively, a reinforcing metallic element may be attached to the mud guard after the molding process is complete, as shown in U.S. Pat. No. 3,953,053 (Arenhold), which discloses a vehicle mud guard having a external metal element to reinforced and stiffen the mud guard at the points of mounting to the vehicle body.

Similarly U.S. Pat. No. Des. 241,829 (Podall) discloses a splash guard for motor vehicle which includes a stainless steel reinforced mounting region.

A mud guard molded around an upper steel insert, or to which a metal reinforcement is otherwise attached, presents certain difficulties in attachment. Often, two-way foam-backed adhesive tape is used to fill the gaps and provide adhesive strength. In addition, the weight of the steel-reinforced unit may require rivets, bolts or similar heavy duty attachment to fix the mud guard to the vehicle body. This results in a mud guard which is expensive because of the added expense of a metal reinforcement insert, additional processing costs and attachment components.

SUMMARY OF THE INVENTION

The purpose and advantages of the invention will be set forth in and apparent from the description and drawings that follow below, as well as will be learned by practice of the invention. Additional advantages of the invention will be realized and attained by the elements of the apparatus and method particularly pointed out in the appended claims.

An object of the invention is to provide a mud guard for a vehicle which is durable and easily mountable to a vehicle.

Another object of the invention is to provide a vehicle mud guard which has relatively rigid upper mounting region and a relatively flexible lower region.

A further object of the invention is to provide an injection molding process for producing a mud guard or similar article having predetermined regions of differing stiffness.

A still further object of the invention is to provide an injection molding process for producing a molded article of unitary construction having predetermined regions of different plastic materials of differing mechanical or physical properties.

To achieve these and other objects and in accordance with the purpose of the invention, as embodied and broadly described herein, a staged coinjection molding process is provided for fabricating a unitary molded vehicular mud guard having regions of differing stiffness. The process includes the steps of injecting thermoplastic material of different mechanical properties in three stages. First, a a small quantity of relatively flexible plastic, in molten state, is injected into a cool mold to harden as a skin near the region of injection. Next, a quantity of relatively stiff plastic, in molten state, is injected at the same location, filling the mold within the skin previously formed. Finally, a second injection of the first, flexible plastic is injected to displace the stiff material.

BRIEF DESCRIPTION OF THE DRAWING FIGURES

The accompanying drawings, which are incorporated in and constitute a part of this specification, illustrate the preferred embodiment of the invention, and together with the description, serve to explain the principles of the invention.

FIG. 1 is a general perspective view of a vehicle mud guard produced by the injection molding process embodying the present invention.

FIG. 2 is a sectional view of the mud guard shown in FIG. 1, taken along line 2—2 of FIG. 1.

DESCRIPTION OF THE PREFERRED EMBODIMENT

Figure 5:
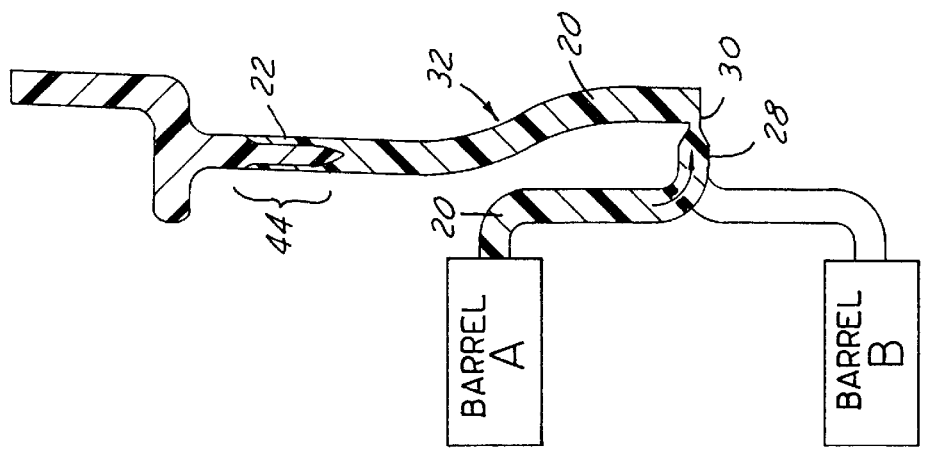
FIG. 5 is a schematic view of the third stage of the injection molding process embodying the present invention.

Reference will now be made in detail to the present preferred embodiment of the mud guard and coinjection process of the present invention. Wherever possible, the same reference characters will be used throughout the drawings to refer to the same or like parts.

Referring particularly to FIG. 1 of the drawings, a vehicle mud guard is shown and identified generally by reference character 10. The mud guard shown is produced according to the process disclosed herein. Mud guard 10 includes mounting structure 12 and lower flap 14. Mounting structure 12 further includes mounting points 16 and 18.

In this embodiment of a mud guard produced according to the invention disclosed herein, mounting structure 12 is formed of relatively rigid plastic material while mud flap 14 is formed of relatively flexible plastic material to absorb shock, especially during periods of cold weather, when impacted snow and ice may adhere to the mud guard.

Mud guard 10 is fabricated of unitary construction through the process of injection molding, which is generally known in the art. The injection molding process may be used for many thermosetting compounds and for most thermoplastics. During injection molding, a granular plastic material is heated and forced through a heated cylinder. The heated quantity of plastic is then injected into the closed mold cavity. After cooling, the plastic article is removed from the mold.

In injection molding, two different plastic materials may be injected into the same mold cavity through the same injection port in a process known as coinjection. In this process, the first injected thermoplastic material is injected into a metal mold which is significantly cooler than the molten plastic introduced therein. The initial quantity of plastic injection is attracted to the cool walls of the mold, where the plastic hardens to form a skin for the finished molded product. A second step in the process is the introduction into the mold of a second plastic material with different properties. This process usually produces a skin of the first material on the article and a center core of the second material, sometimes of cellular construction (through the incorporation in the plastic of a blowing agent).

The present invention provides for a staged coinjection of two thermoplastic materials into the mold producing the illustrated mud guard so as to provide pre-determined regions of different flexibility in the mud guard. In this way, the mud guard may be easily and economically fashioned having a relatively rigid mounting structure and relatively flexible flap portion.

The coinjection molding process embodying the present invention may be used in applications not limited to the manufacture of vehicular mud guards, but may be used in the manufacture of any article where it is required or desirable to have a piece of unitary plastic construction having predetermined regions of differing flexibility or other different properties. The properties referred to include the properties inherent in polymeric materials, including mechanical properties. The mechanical properties of polymeric materials include compressive strength, tensile strength, modulus of elasticity, impact strength, flexural strength or modulus, shear strength, fatigue and flexing, hardness, indentation and friction.

As described herein, "stiff" and "flexible" are used to refer to the respective properties of high and low flexural modulus, measuring the amount of stress the material can withstand before failure.

The process embodying the present invention uses the process of coinjection to mold a finished article having different mechanical properties in pre-selected regions of the article. As shown in the preferred embodiment in FIGS. 1 and 2 of the drawings, mounting structure A of the illustrated mud guard is formed of relatively rigid thermoplastic material, while mud flap region B is formed of relatively flexible thermoplastic material.

While fabrication of a molded plastic article such as the illustrated mud guard may provide the benefits of upper stiffness and lower flexibly through the use of two thermoplastic materials of different flexural properties, it is important to manufacture such an article with a strong interface between the two dissimilar materials, to reduce the risk of delamination of the finished article along a line of demarcation between the two dissimilar materials.

The process embodying the present invention produces a molded article of two thermoplastic materials having dissimilar properties, with an overlapping interface to prevent delamination.

Figure 4:
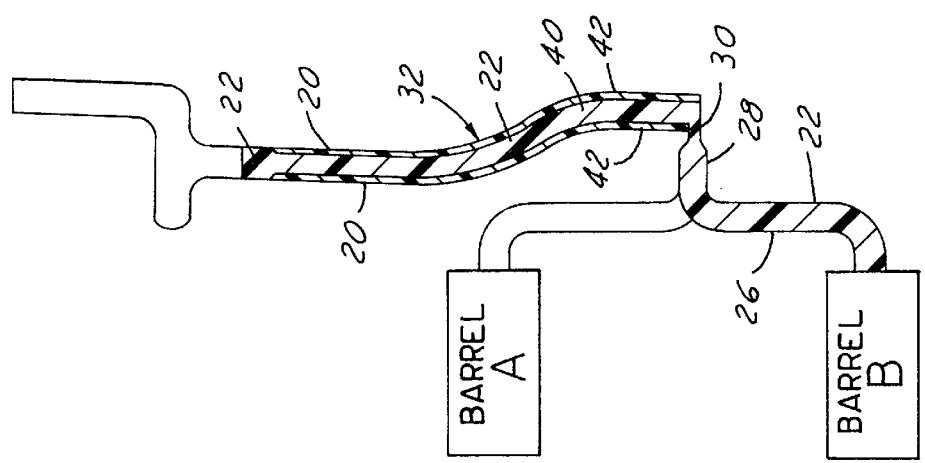
FIG. 4 is a schematic view of the second stage of the injection molding process embodying the present invention.
Figure 3:
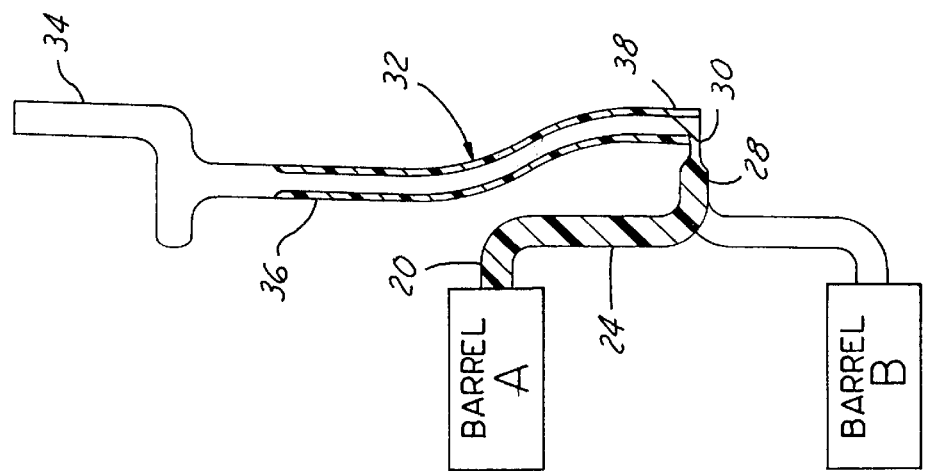
FIG. 3 is a schematic view of the first stage of the injection molding process embodying the present invention.

The process embodying the present invention is schematically shown in FIGS. 3–5. In these figures, the pressurized sources of thermoplastic material are identified as Barrels A and B. These barrels supply thermoplastic material having different flexural qualities. In this preferred embodiment, Barrel A supplies low flexural modulus ("LFM") thermoplastic material 20 while Barrel B is the source of high flexural modulus ("HFM") thermoplastic material 22. As shown in FIGS. 3, 4, and 5, Barrel A and Barrel B supply plastic through conduits 24 and 26, respectively, into joint conduit 28 which leads into injection port 30 at the bottom, or proximal, end of mold cavity 32. In the representation shown in FIGS. 3, 4, and 5, mold cavity 32 is shaped to form a finished mud guard with mounting structure 12 formed in upper mold region 34, and lower mud flap 14 formed in lower mold region 36.

As shown in FIG. 3, a first quantity of LFM molten thermoplastic material 20 is introduced under pressure through injection port 30 into mold cavity 32. It has been determined that this first quantity should be approximately 10–25% of the total plastic injected into the mold. The thermoplastic material 20 migrates along mold cavity walls 38 and solidifies as a skin along the walls of the cavity as previously described.

The second stage of the process is illustrated at FIG. 4. In this view, the supply of thermoplastic material from Barrel A is shut off and the supply of HFM thermoplastic material 22, in molten state, is supplied from Barrel B through conduit 26 and joint conduit 28, through injection port 30 and into the lower region 36 of mold cavity 32. In this stage of the injection molding process, the supply of plastic from Barrel B flows up the mold cavity, inside the skin formed by the plastic from Barrel A. As shown in FIG. 4, molten plastic from Barrel B is sandwiched between the skin layers adhering to cavity walls 38. This flow of plastic from Barrel B fills interstice 40 between opposite skin layers 42.

The quantity of HFM plastic 22 introduced in the second stage of the process is sufficient to fill the upper region of the mold cavity to provide stiffness in the mounting structure of the finished product. After a sufficient quantity of plastic is supplied from Barrel B into mold cavity 32, Barrel B is shut off. shown in FIG. 5, In the third stage of the process shown in FIG. 5, LFM plastic material 20 from Barrel A is introduced into mold cavity 32 at injection port 30. The flow of LFM plastic 20 displaces ahead of it HFM plastic 22 in interstice 40. As HFM plastic 22 evacuates interstice 40, LFM plastic 20 replaces it, completing the filling of the lower mud flap portion of the mold cavity with relatively flexible plastic.

The process just described results in an interface region 44 at the juncture of lower mud flap region 14 and upper mounting structure 12 at which the two plastic materials of dissimilar flexural qualities are overlapped. The multiple layer, longitudinal sandwich interface thus formed helps to maintain the structural integrity of the finished piece by preventing delamination between the two dissimilar plastic materials.

The process just described for producing a unitary piece of dissimilar plastic materials alternatively could incorporate an injection port in the region of the mold cavity used to form the relatively stiff portion of the finished article. In this alternative embodiment of the process (not shown) the first stage would involve injection of the relatively stiff plastic material to form a skin adjacent the mold cavity walls in the injection region. This would be followed by the injection of the flexible material in molten state. Finally, the mold would be filled with a second quantity of the stiff plastic material to displace the flexible material from the intended stiff region.

Alternative uses of this process are anticipated. For example, a star-shaped article could be manufactured with a relatively stiff center structure and relatively flexible radiating sections. This structure could be manufactured using an injection port located at the center of the mold cavity, with an initial shot of stiff (HFM) plastic, followed by an intermediate shot of flexible (LFM) plastic, followed by a final shot of stiff plastic to force the flexible plastic to the outer regions of the mold cavity.

It is also anticipated that the staged coinjection molding process just described could be enhanced by the introduction of pressurized gas (not shown) to form voids at predetermined locations. This additional process, known in the art as "gas injection molding" could be used to further improve the structural rigidity and or the aesthetic qualities of the finished article, as desired.

In view of the description above, it is evident that the apparatus and method of the present invention are simple and inexpensive to construct and perform, respectively, yet provide enhanced efficiency as well as reduced manufacturing and processing costs.

Although reference has been made to the use of the present method invention to manufacture a vehicular mud guard, it is understood that the manufacturing of other products may benefit from the present invention. It also will be apparent to those skilled in the art that various modifications and variations can be made in the mud guard and coinjection molding process without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A process for producing a vehicular mud guard having predetermined regions of differing flexibility, in a mold defining a cavity having a proximal end and a distal end, and having an injection conduit having a downstream end located adjacent to and in fluid communication with said proximal end, and an upstream end in fluid communications with at least two pressurized sources of thermoplastic material, said process including the steps:
   a. introduction of a first quantity of thermoplastic material from a first source through said conduit into said cavity to form a skin of the first material in contact with the cavity, said skin defining a space;
   b. introduction of a second quantity of thermoplastic material from a second source through said conduit into said space; and
   c. introduction of a third quantity of thermoplastic material from said first source through said conduit into said space,
   whereby said third quantity of thermoplastic material displaces said second quantity of thermoplastic material to the distal end of said cavity.

2. A molding process as in claim 1, wherein said thermoplastic material from said first source is dissimilar to said thermoplastic material from said second source.

3. A vehicular mud guard produced by the process of claim 2.

4. A molding process as in claim 2, wherein said thermoplastic material from said first source and said thermoplastic material from said second source have different physical properties.

5. A vehicular mud guard produced by the process of claim 4.

6. A molding process as in claim 2, wherein said thermoplastic material from said first source and said thermoplastic material from said second source have different mechanical properties.

7. A vehicular mud guard produced by the process of claim 6.

8. A molding process as in claim 2, wherein each of said thermoplastic material from said first source and said thermoplastic material from said second source has a different flexural modulus.

9. A molding process as in claim 8, wherein said thermoplastic material from said first source has a low flexural modulus and said thermoplastic material from said second source has a high flexural modulus.

10. A vehicular mud guard produced by the process of claim 9.

11. A molding process as in claim 8, wherein said thermoplastic material from said first source has a high flexural modulus and said thermoplastic material from said second source has a low flexural modulus.

12. A vehicular mud guard produced by the process of claim 4.

13. A vehicular mud guard produced by the process of claim 8.

14. A molding process as in claim 1, wherein said first quantity of thermoplastic material is between 10% and 25% of the total of the first, second and third quantities of thermoplastic material injected into said mold cavity.

15. A vehicular mud guard produced by the process of claim 14.

16. A vehicular mud guard produced by the process of claim 1.

\* \* \* \* \*

UNITED STATES PATENT AND TRADEMARK OFFICE
CERTIFICATE OF CORRECTION

PATENT NO.   : 5,899,500
DATED        : May 4, 1999
INVENTOR(S)  : Guido Benvenuto It is certified that error appears in the above-indentified patent and that said Letters Patent is hereby corrected as shown below:

In Column 6, Claim 12, "4" should be --11--.

Signed and Sealed this

Thirty-first Day of August, 1999

Attest:

Q. TODD DICKINSON

*Attesting Officer*     *Acting Commissioner of Patents and Trademarks*